E. W. BURGESS.
SHOCK HOIST.
APPLICATION FILED MAR. 13, 1916.
1,345,068.
Patented June 29, 1920.
3 SHEETS—SHEET 2.
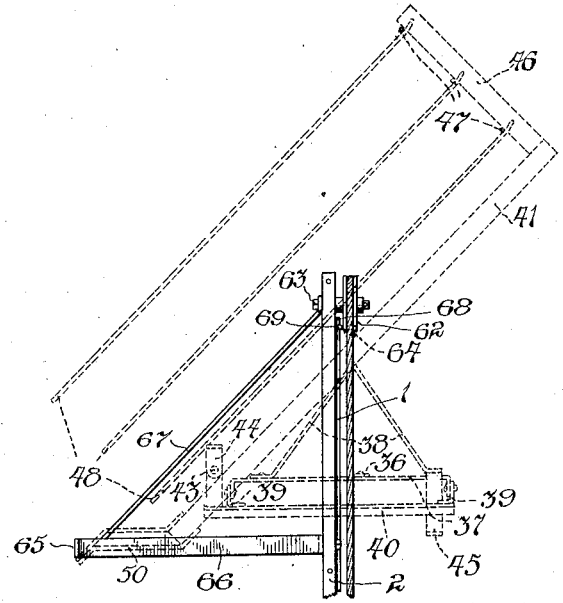
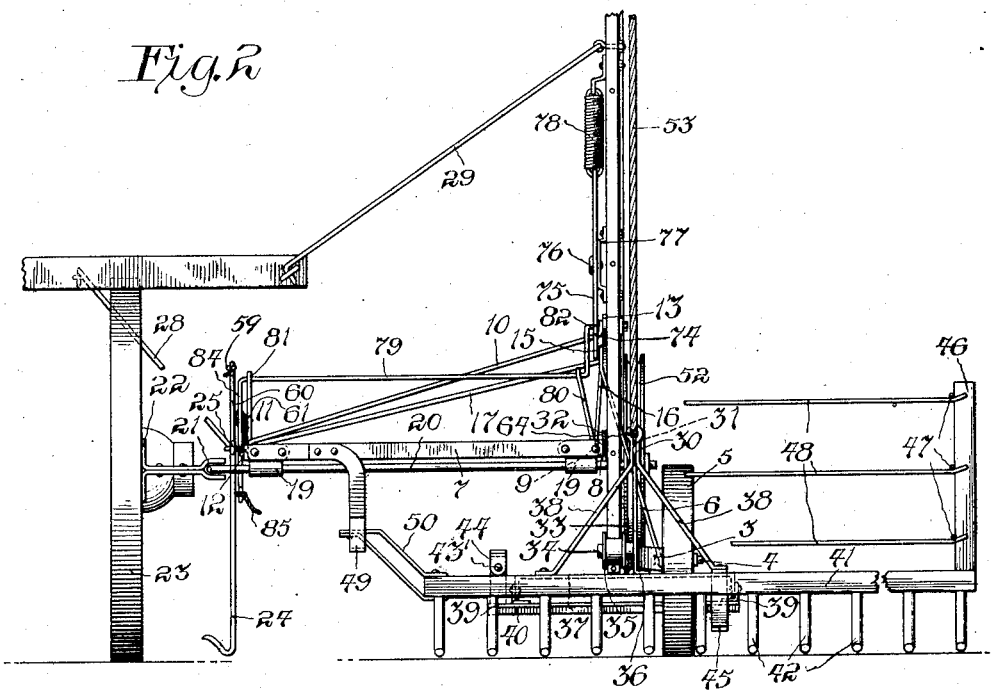
Fig. 2.
Inventor
Edward W. Burgess.
By *Chas. E. Lord* Atty.

E. W. BURGESS.
SHOCK HOIST.
APPLICATION FILED MAR. 13, 1916.
1,345,068.
Patented June 29, 1920.
3 SHEETS—SHEET 3.
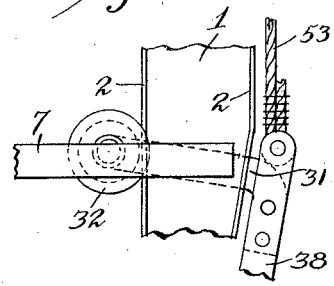
Fig. 6.
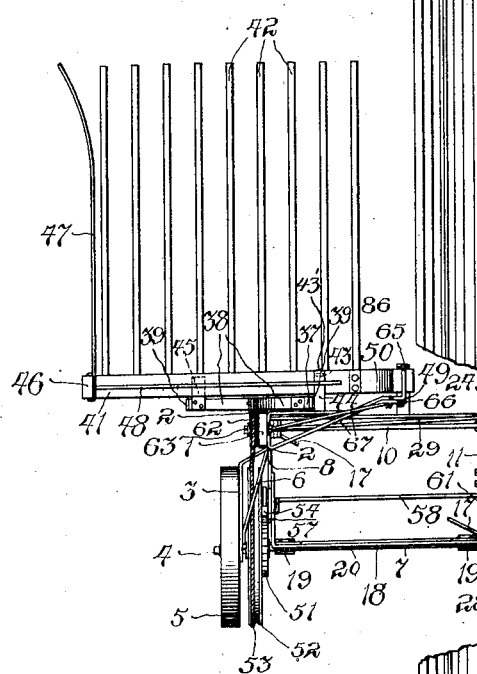
Fig. 3.
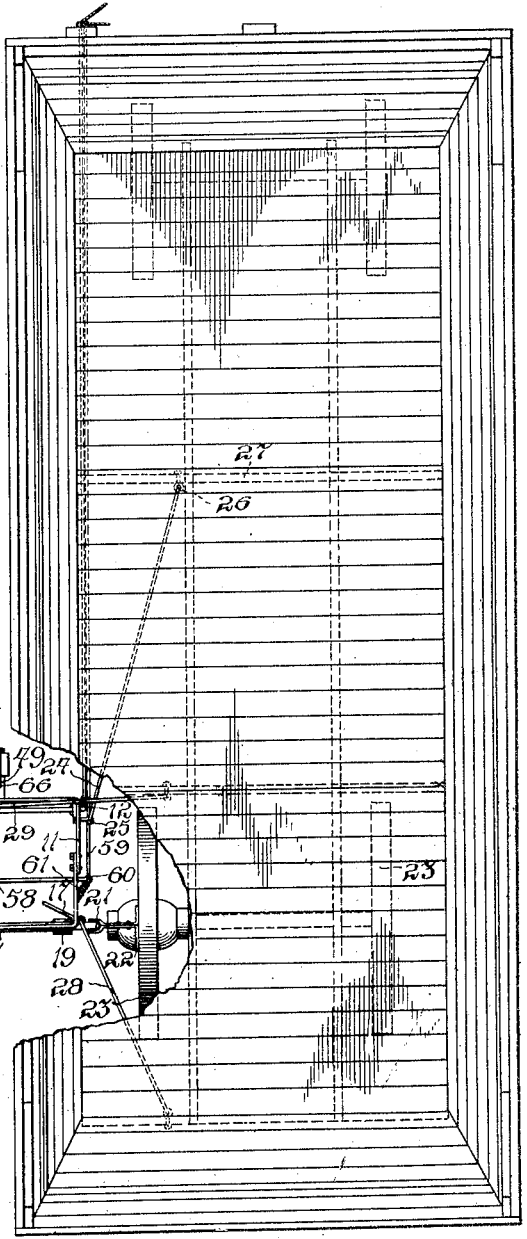
Inventor.
Edward W. Burgess.
By Chas. E. Lord
Atty

UNITED STATES PATENT OFFICE.

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

SHOCK-HOIST.

1,345,068.  Specification of Letters Patent.  Patented June 29, 1920.

Application filed March 13, 1916. Serial No. 83,928.

*To all whom it may concern:*

Be it known that I, EDWARD W. BURGESS, a citizen of the United States, residing at Chicago, in the county of Cook and State of Illinois, have invented certain new and useful Improvements in Shock-Hoists, of which the following is a full, clear, and exact specification.

My invention relates to shock hoists adapted to be attached to a wagon carrying a receiving rack, and including a fork operative to pass under a cock of hay or a shock of sheaves of grain and lift it to a predetermined plane and automatically discharge it into the rack during the advance of the wagon, and having its operative parts connected with one of the carrying wheels of the wagon and their movement controlled by the operator.

The object of my invention is to provide a power driven mechanism that may be connected with any farm wagon and rack, that will replace manual labor in pitching hay or grain from the ground into the rack as it is being moved from shock to shock in a field.

This object is attained by means of the mechanism illustrated in the accompanying drawings, in which—

Fig. 2 is a front elevation of Fig. 1;

Fig. 3 is a top plan view of the hoist, a wagon and rack, and designed to illustrate the manner of coupling them together;

Fig. 4 is a rear elevation of a portion of the hoist;

Fig. 5 is an enlarged detail view of the hoisting drum and coöperating pawl and ratchet mechanism; and, Fig. 6 is an enlarged view showing the guiding connection between the hoisting fork and the mast.

The same reference characters designate like parts throughout the several views.

Figure 1:
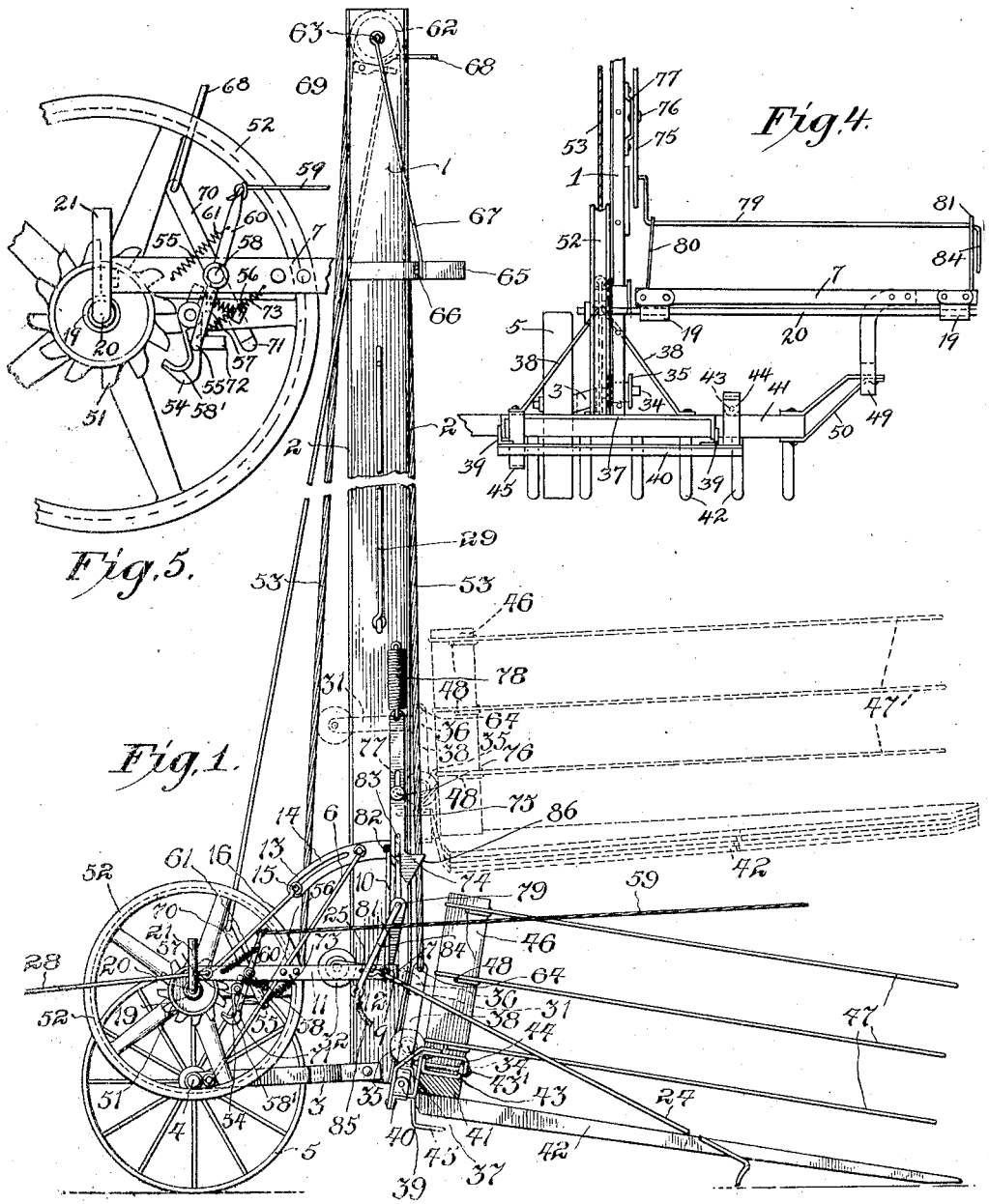
Figure 1 is a side elevation of a shock hoist embodying my invention.

1 represents a vertically disposed mast, preferably made of wood, and provided with reinforcing plates 2 secured to its opposite edges, 3 a rearwardly extending bar having its front end secured to the lower end of the mast and having a stud 4 secured to its rear end, upon which is journaled a carrying wheel 5, 6 a laterally and upwardly extending brace member having its lower end secured to the rear end of the bar and its upper end to the mast, 7 a rectangular frame extending laterally and rearwardly from the lower end of the mast and to which the front end of its outside end 8 is pivotally secured by means of a bolt 9, 10 an upwardly and outwardly extending truss rod having its inner lower end secured to the front end of the opposite end 11 of the frame coaxially with the bolt 9 by means of a bolt 12 in a manner permitting the frame to be adjusted about the axis of the two bolts, 13 a curved bar having its front end secured to the mast and extending rearward therefrom and provided with a slotted opening 14 disposed concentric with the axis of the bolts 9 and 12. Adjustably secured to the rear end of the curved bar by means of a bolt 15, received by the slotted opening, are the upper ends of two truss rods 16 and 17, having their lower opposite ends secured to the rear ends of the end members 8 and 11, respectively, of the rectangular frame 7. Secured to the rear side member 18 of the rectangular frame are bearing boxes 19, in which is journaled a transversely disposed shaft 20, provided at its inner end with a laterally extending arm 21 that is received by a forked bracket member 22 secured to the spokes of one of the rear wheels 23 of the wagon in a manner whereby the shaft 20 is rotated by the wheel, the rectangular frame 7 being adjustable about its axis for the purpose of placing the shaft in axial alinement with the axis of the wheel.

24 represents a longitudinally disposed draft rod having its rear end flexibly connected with the front end of the rectangular frame member 11 by means of an eye bolt 25, and extending forward, upward and inward is provided at its front end with a hook that is releasably received by an eye bolt 26 secured to a side frame member 27 of the rack bed, and 28 a corresponding draft rod connecting the rear end of the frame member 11 with the rear end of the bed of the rack in a like manner. The draft rods being disposed inward at an angle relative to the line of draft and inclined upward from the plane of the rectangular frame, will operate to hold the arm 21 of shaft 20 in engagement with the bracket member 22, and 29 represents an upwardly and outwardly inclined rod that detachably connects the mast with the rack in a manner to maintain the mast in an upright position when the hoist is in an operative position.

The hoisting mechanism comprises a carriage including an L-shaped bar 30, having one arm 31 extending rearwardly across the mast 1 upon its outside and carrying a laterally extending stud at its rear end, upon which is journaled a flanged roller 32 adapted to travel upon the rear edge of the mast, and 33 represents a vertically disposed leg member carrying a stud 34 at its lower end, upon which is journaled a flanged roller 35 adapted to travel upon the front edge of the mast, and below said roller a portion 36 of the leg is turned laterally and secured to a transversely disposed bar 37. 38 represents downwardly diverging truss members, having their upper ends secured to the upper end of the leg 33 and their opposite ends to opposite ends of the transverse bar 37. The opposite ends of the bar 37 are turned downward to form ear members, to which are hingedly connected ear members 39 that are secured to opposite ends of a transverse bar 40.

The hoisting fork includes a transversely disposed head 41, having the rear ends of a series of forwardly extending tines 42 secured thereto. 43 represents a U-shaped saddle member secured to the upper side of the fork head 41 intermediate its ends, whereby the head is pivotally connected, by means of a hinge pin 43$^1$, with a bracket member 44 secured to the inner end of the transverse bar 40 beyond its hinge connection with the bar 37. 45 represents a depending hook having its upper end secured to the outside end of the bar 37 and its lower end turned forward to a position to engage with the lower side of the fork head 41 in a manner to limit a turning movement thereof in one direction about the axis of the hinge pin 43$^1$ and also a turning movement of the fork about the axis of the bar 40. Secured to the outside end of the fork head 41 is a vertically disposed standard 46, having the rear ends of a series of forwardly extending guard rods 47 secured thereto, the front ends of the rods being turned outward in order that they may properly pass along the side of a shock as the tines of the fork are passing under it, and 48 other guard rods secured to the standard and extending inward above the head of the fork in position to prevent a load upon the fork from tipping rearward as it is being hoisted. To retain the fork relatively rigid against a lateral swinging movement when its tines are in contact with the ground and receiving a shock, there is provided a depending hook-shaped member 49 carried by the front side of the rectangular frame 7 and adapted to receive the free end of an arm 50 extending inward and upward from the inner end of the fork head 41.

Means for hoisting the fork with its load include a ratchet toothed wheel 51 secured to the shaft 20, and journaled on the shaft adjacent the wheel is a winding sheave 52, having one end of a hoisting rope 53 secured thereto. A clutch mechanism operative to intermittently connect the sheave with the ratchet wheel includes a pawl 54 pivotally mounted upon the sheave and adapted to engage with the ratchet wheel and normally retained disengaged by means of a compression spring 55 interposed between the heel of the pawl and an ear member 56 on the sheave. 57 represents a pawl tripping lever secured to a rock shaft 58 journaled in the end members of the rectangular frame 7, and having its lower end adapted to engage with a laterally extending rib 58$^1$ upon the pawl, and 59 represents a line connected with the free end of a vertically disposed arm 60 secured to the inner end of the shaft and leading to the front end of the rack within convenient reach of the operator. 61 represents a tension spring connecting the arm 60 with a fixed part of the frame and operative to normally hold the pawl tripping lever 57 disengaged from the pawl 54. The hoisting rope 53 is led from the winding sheave upward and over a sheave 62 journaled upon a stud 63 secured to the upper end of the mast and then down along the mast and connected with an eye member 64 at the upper end of the L-shaped member 30 of the fork carrier. When the clutch mechanism connecting the ratchet wheel 51 with the winding sheave 52 is thrown into operation by the operator pulling upon the line 59, the sheave will rotate with the shaft 20 and cause the rope 53 to hoist the fork and its load upward along the mast, and when the fork carrier is near the limit of its upward movement the free end of the arm 50 carried by the fork head 41 will engage with the forwardly turned part 65 of a laterally extending bar 66 secured to the mast 1 and supported by means of brace members 67 in a manner to tilt the fork about its axis to dump its load into the receiving rack. As the fork is being tilted in a direction to discharge its load its carrier continues to move upward along the mast, and during such part of its movement it engages with the forwardly turned upper end of a rod 68 slidably supported by a bracket 69 secured to the mast and having its lower end connected with the upper end of a pawl releasing member 70 pivotally mounted intermediate its ends upon the member 8 of the rectangular frame 7, preferably coaxially with the pawl tripping lever 57, and provided at its lower end with a laterally extending lug 71 adapted to engage with an arm 72 integral with the pawl 54, and 73 represents a tension spring connecting the pawl releasing member with the frame member and operative to normally hold it disengaged from the pawl. When the pawl is disengaged from the ratchet wheel the fork and its carrier will descend, assisted by gravity, until it reaches a predetermined plane from the ground, when the bar 40 of the carrier will engage with the lower hooked end 74 of a fork retaining member 75 that is slidably mounted upon a stud 76 carried by a bracket 77 secured to the mast, the upper end of the retaining member being connected with the lower end of a tension spring 78, having its upper end connected with a clip member secured to the mast whereby the retaining member is permitted to move to a limited extent downward in a manner to cushion the engagement of the fork carrier therewith. To disengage the hook 74 from the fork carrier there is provided a rock shaft 79 journaled in vertically disposed arms 80 and 81 secured to the end members 8 and 11, respectively, of the rectangular frame 7. The end of the shaft adjacent the arm 80 is turned upward and then laterally, forming a crank pin 82 that is received by a slotted opening 83 in the lower end of the fork retaining member 75. The opposite end of the rock shaft is provided with a depending arm 84, to which is connected a line 85 that leads to the front end of the rack convenient to the operator. When the line is pulled forward the shaft 79 is rocked in a direction to swing the fork retaining hook 74 rearward about the axis of the member 75 against the tension of the spring 78 and release it from engagement with the bar 40, and the fork is permitted to descend to the ground in a position to receive a shock. When the fork is being drawn upon the ground to receive a shock the pivotal connection of the bar 40 with the carrier bar 37 will permit the tines to freely rise and fall in following uneven ground surface, and the pivotal connection of the fork head with the bar 40 will allow the fork to tilt laterally relative to the line of draft. The lower end of the mast 1 is inclined rearward at its front edge in a manner permitting the fork carrier to tilt rearward about the axis of the flanged roller 32 and thereby maintain the fork in an upwardly and rearwardly inclined position as it receives the shock. During the initial movement of the fork carrier in hoisting the fork it moves away from the rearwardly inclined portion of the mast, and the fork will be tilted upward and rearward, and as the engagement of the hook 45 with the fork head is delayed the fork is tilted laterally and outwardly sufficient to maintain a proper equilibrium of the load as it is being hoisted.

The hook 74 is provided with a downwardly and rearwardly inclined part 86 with which the fork carrier engages in a manner to swing the hook rearward against the tension spring 78 and allow the carrier to pass it as the load is being hoisted.

In operation the wagon is drawn to one side of the hoist, that is substantially balanced upon its carrying wheel, and as the machine is comparatively light, it may be readily wheeled into a position relative to the wagon to permit the laterally turned arm 21 of the shaft 20 to be received by the forked bracket 22. The draft rods 24 and 28 and the inclined rod 29 are then connected with the rack bed and mast, respectively, and the clutch tripping line 59 and line 85 connected with the fork retaining mechanism are connected with the front of the rack whereby the operator may control the operation of the hoisting mechanism.

Having shown and described one embodiment of my invention, it is realized that many changes may be made in the form, proportion and organization of its various specific mechanical elements without departing from the spirit of the invention as indicated in the appended claims.

What I claim as my invention, and desire to secure by Letters Patent, is:

1. A shock hoist including, in combination, a supporting frame, a shock receiving element carried by said frame, a hoisting mechanism including a winding drum operatively mounted upon said frame and connected with said shock receiving element, a wagon including carrying wheels and a receiving rack, draft connections between said frame and said rack, means for adjusting said winding drum bodily on said frame, and operative connections between said hoisting mechanism and one of said wagon wheels.

2. A shock hoist including, in combination, a wheel supported frame, a shock receiving element carried by said frame, a hoisting mechanism including a shaft operatively mounted upon said frame and connected with said shock receiving element, a wagon including carrying wheels and a receiving rack, draft and frame supporting members connecting said frame with said wagon, means for vertically adjusting said shaft on said frame, and operative connections between said hoisting mechanism and one of said wagon wheels.

3. A shock hoist including, in combination, a vertically disposed mast, a hoisting mechanism adjustably carried by said mast, a shock receiving element movable upon said mast and operatively connected with said hoisting mechanism, a wagon including carrying wheels and a receiving rack, means for connecting said mast with said rack, and operative connections between said hoisting mechanism and one of said wagon wheels.

4. A shock hoist including, in combination, a wheel supported vertically disposed mast, rotatable hoisting mechanism carried by said mast, a shock receiving and hoisting fork movable upon said mast and operatively connected with said hoisting mechanism, a wagon including carrying wheels and a receiving rack, draft and supporting members connecting said mast with said rack, connections between said hoisting mechanism and one of said wagon wheels and means for alining the axis of said hoisting mechanism and the axis of one of said wagon wheels.

5. A shock hoist including, in combination, a vertically disposed mast, a hoisting mechanism carried by said mast, a carriage movable upon said mast and operatively connected with said hoisting mechanism, said carriage including a vertically disposed bar having flanged rollers journaled thereon and adapted to travel upon the front and rear edges of said mast, a transverse bar secured to the lower end of said first bar, and a fork head pivotally connected with said transverse bar in a manner permitting it to tilt forward and laterally to a limited extent relative to the line of draft.

6. A shock hoist including, in combination, a vertically disposed mast, a hoisting mechanism carried by said mast, a carriage movable upon said mast and operatively connected with said hoisting mechanism, said carriage including an L-shaped member comprising a rearwardly extending arm and a downwardly extending leg member, flanged rollers journaled upon the ends of said arm and leg members and adapted to travel upon opposite edges of said mast, downwardly diverging truss members having their upper ends secured to the upper end of said L-shaped member, a transverse bar secured to the lower ends of said truss and leg members, a second transverse bar hingedly connected to said first bar, and a fork head pivotally connected with said second transverse bar whereby said head is permitted a tilting movement forward and laterally relative to the line of draft.

7. A shock hoist including, in combination, a vertically disposed mast, a laterally extending frame adjustably secured to said mast, a shaft journaled in bearings carried by said frame, a hoisting element journaled upon said shaft, a clutch mechanism operative to intermittently connect said hoisting element with said shaft, a carriage adapted to travel upon said mast, a shock receiving fork carried by said carriage, a flexible connection between said hoisting element and said carriage, a wagon including carrying wheels and a rack, draft members connecting said frame with said wagon, operative connections between said shaft and one of said carrying wheels, and means for controlling the operation of said clutch mechanism.

8. A shock hoist including, in combination, a vertically disposed mast, a transverse rotatable shaft supported by said mast, a hoisting element journaled upon said shaft, a clutch mechanism operative to intermittently connect said hoisting element with said shaft, a shock receiving and hoisting fork adapted to travel upon said mast, a flexible connection between said hoisting element and said fork, a wagon including carrying wheels and a rack, draft members connecting said hoist with said rack, operative connections between said shaft and one of said carrying wheels, and means for adjusting said shaft in varying planes to place it in axial alinement with the axes of wheels having different diameters.

9. A shock hoist including, in combination, a frame including a vertically disposed mast, a rotatable shaft mounted upon said frame, hoisting elements operatively connected with said shaft, a wagon including carrying wheels and a rack, draft members connecting said frame with said rack, means for operatively connecting said shaft with one of said carrying wheels, and means for adjusting said shaft in varying planes to place it in axial alinement with wheels having different diameters.

10. A shock hoist including, in combination, a vertically disposed wheel supported mast, a laterally and rearwardly extending frame pivotally connected with said mast, a shaft journaled in bearings carried by said frame, hoisting mechanism connected with said shaft, a wagon including carrying wheels and a rack, draft members connecting said frame with said rack, means for operatively connecting said shaft with one of said carrying wheels, and means for adjusting said frame about its pivotal connection with said mast whereby said shaft may be carried in varying planes to place it in axial alinement with wheels having different diameters.

11. A shock hoist including, in combination, a vertically disposed wheel supported mast, a laterally and rearwardly extending frame pivotally connected with said mast, a shaft journaled in bearings carried by said frame and provided with a laterally extending arm at one end thereof, hoisting mechanism connected with said shaft, a wagon including carrying wheels and a rack, draft members connecting said frame with said rack, a bracket member secured to one of said wheels and adapted to engage with the arm on said shaft, and means for adjusting said frame about its pivotal connection with said mast whereby said shaft may be carried in varying planes to place it in axial alinement with wheels having different diameters.

12. A shock hoist including, in combination, a vertically disposed mast, a shock receiving and hoisting element adapted to travel upon said mast in elevating and discharging its load, means for elevating said hoisting element and permitting it to return to an operative position, a vertically yielding cushioning and retaining member carried by said mast intermediate the ends thereof and adapted to engage with said hoisting element when it has reached a predetermined plane in its return movement to cushion the same, and means for releasing said yielding retaining member from engagement with said hoisting element thereby permitting said hoisting element to complete its return movement.

13. A shock hoist including, in combination, a vertically disposed mast, a shock receiving and hoisting element adapted to travel upon said mast in elevating and discharging its load, means for elevating said hoisting element and permitting it to return to an operative position, a vertically yielding retaining member carried by said mast and adapted to engage with said hoisting element when it has reached a predetermined plane in its return movement, and means for releasing said retaining member from engagement with said hoisting element thereby permitting said hoisting element to complete its return movement.

14. A shock hoist including, in combination, a vertically disposed mast, a shock receiving and hoisting fork adapted to travel upon said mast in elevating and discharging its load, means for elevating said fork and permitting it to return to an operative position, a vertically disposed fork retaining and cushioning bar pivotally mounted upon said mast and provided at one end thereof with a hook portion adapted to engage with said hoisting fork when said fork has reached a predetermined plane in its return movement, and means for releasing said bar from engagement with said fork thereby permitting said fork to complete its return movement.

15. A shock hoist including, in combination, a vertically disposed mast, a shock receiving and hoisting fork adapted to travel upon said mast in elevating and discharging its load, means for elevating said fork and permitting it to return toward an operative position, a vertically disposed fork retaining bar pivotally mounted intermediate its ends upon said mast and provided upon its lower end with a hook portion adapted to engage with said fork when said fork has reached a predetermined plane in its return movement, a vertically disposed tension spring connecting the opposite end of said bar with said mast, and means for releasing said hook from engagement with said fork.

In testimony whereof I affix my signature.

EDWARD W. BURGESS.